United States Patent
Utakouji et al.

(10) Patent No.: US 8,369,236 B2
(45) Date of Patent: Feb. 5, 2013

(54) FREQUENCY DIVISION MULTIPLEX TRANSMISSION DEVICE

(75) Inventors: Akira Utakouji, Yokohama (JP); Kenichiro Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 425 days.

(21) Appl. No.: 12/632,889

(22) Filed: Dec. 8, 2009

(65) Prior Publication Data

US 2010/0080208 A1 Apr. 1, 2010

Related U.S. Application Data

(63) Continuation of application No. PCT/JP2007/061781, filed on Jun. 12, 2007.

(51) Int. Cl.
*G01R 31/08* (2006.01)
*H04J 1/00* (2006.01)
*H04J 3/16* (2006.01)

(52) U.S. Cl. .......................... 370/252; 370/343; 370/465

(58) Field of Classification Search ........................ None
See application file for complete search history.

(56) References Cited

U.S. PATENT DOCUMENTS

| | | | |
|---|---|---|---|
| 6,567,394 B1 * | 5/2003 | Arisawa | 370/343 |
| 7,522,544 B2 * | 4/2009 | Cheng et al. | 370/310 |
| 7,852,814 B2 * | 12/2010 | Imamura et al. | 370/335 |
| 7,903,538 B2 * | 3/2011 | Jacobsen et al. | 370/208 |
| 7,965,649 B2 * | 6/2011 | Tee et al. | 370/252 |
| 2005/0147076 A1 * | 7/2005 | Sadowsky et al. | 370/343 |

FOREIGN PATENT DOCUMENTS

| | | |
|---|---|---|
| JP | 11330834 | 11/1999 |
| JP | 2001103032 | 4/2001 |
| JP | 2001352221 | 12/2001 |
| JP | 2002237795 | 8/2002 |
| JP | 2003069527 | 3/2003 |
| JP | 2004193896 | 7/2004 |
| JP | 2006094150 | 4/2006 |
| JP | 2006186630 | 7/2006 |
| WO | 2006059566 | 6/2006 |

OTHER PUBLICATIONS

International Search Report dated Sep. 4, 2007.

* cited by examiner

*Primary Examiner* — Nittaya Juntima
(74) *Attorney, Agent, or Firm* — Murphy & King, P.C.

(57) ABSTRACT

A frequency multiplex transmission device configured to transmit and receive a frequency multiplex signal having a plurality of subcarriers, the frequency multiplex transmission device comprising: a transmitter configured to transmit the frequency multiplex signal by using a plurality of modulation methods; a receiver configured to receive a signal state to the frequency multiplex signal from an opposite station; and a controller configured to obtain a signal state to each of the subcarriers on the basis of the received signal state and a frequency characteristic of an antenna included in the transmitter, the controller being configured to control transmission on the basis of an obtained result.

6 Claims, 11 Drawing Sheets

| SNR | MODULATION METHOD |
|---|---|
| MORE THAN OR EQUAL 15dB | 64QAM |
| MORE THAN 11dB AND LESS THAN 15dB | 16QAM |
| LESS THAN OR EQUAL 11dB | QPSK |

US 8,369,236 B2

FREQUENCY DIVISION MULTIPLEX TRANSMISSION DEVICE

CROSS-REFERENCE TO RELATED APPLICATION

This is a continuation application of international PCT application No. PCT/JP2007/061781 filed on Jun. 12, 2007 the entire contents of which are incorporated herein by reference.

FIELD

The embodiments discussed herein are related to a frequency division multiplex transmission device.

BACKGROUND

Systems such as IEEE 802.11 (WiFi), IEEE802.16 (WiMAX), 3.9G wireless access network communication (LTE) and 4G wireless access network communication (4G) are listed as a communication system employing frequency division multiplex transmission such as OFDM transmission including OFDMA.

A transmission system using OFDM uses RF frequencies in a broad range by means of a multiple carrier system. Further, the transmission system using OFDM can have robustness against frequency selective fading by using error correction technology and so on. In some cases, a system using OFDM transmission changes a modulation method of a subcarrier forming multiple carriers.

Meanwhile, an antenna to be used for a transmission device configured to perform OFDM transmission does not have a standing wave ratio characteristic (SWR characteristic) which is uniform in a whole RF frequency range. An ordinary antenna generally has a frequency-SWR characteristic illustrated in FIG. 1. In FIG. 1, the SWR is small and impedance is matched at a central frequency. Meanwhile, in FIG. 1, the SWR grows and impedance matching becomes insufficient as the frequency goes away from the central frequency. There is a thought of giving an antenna a plurality of resonant frequencies as illustrated in FIG. 2. If the SWR characteristic is different from the whole RF frequency range in which the OFDM transmission is performed as illustrated in FIG. 1 or 2, the SWR characteristic is affected by a frequency-gain deviation. Thus, there is a problem that the OFDM signal transmission system of a broad frequency range is affected by the frequency-gain deviations of the antenna and feeder systems illustrated in FIG. 1 and FIG. 2. A significant effect of the frequency-gain deviation may cause a problem that an opposite receiver produces lots of errors of signal identification.

Japanese Laid-Open Patent Publication No. 2002-237795 is known as an example of related art.

SUMMARY

According to an aspect of the invention, a frequency multiplex transmission device configured to transmit and receive a frequency multiplex signal having a plurality of subcarriers, the frequency multiplex transmission device comprising: a transmitter configured to transmit the frequency multiplex signal by using a plurality of modulation methods; a receiver configured to receive a signal state to the frequency multiplex signal from an opposite station; and a controller configured to obtain a signal state to each of the subcarriers on the basis of the received signal state and a frequency characteristic of an antenna included in the transmitter, the controller being configured to control transmission on the basis of an obtained result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of the present invention will be explained with reference to the drawings hereafter. It is intended that a configuration of the embodiment be considered as exemplary only, and the present invention is not limited to the configuration of the embodiment. Although the following embodiment will be explained below as one that uses OFDM transmission (including OFDMA) as an example of frequency division multiplex transmission, the embodiment can use another method of frequency division multiplex transmission that uses a plurality of subcarriers.

Figure 3:
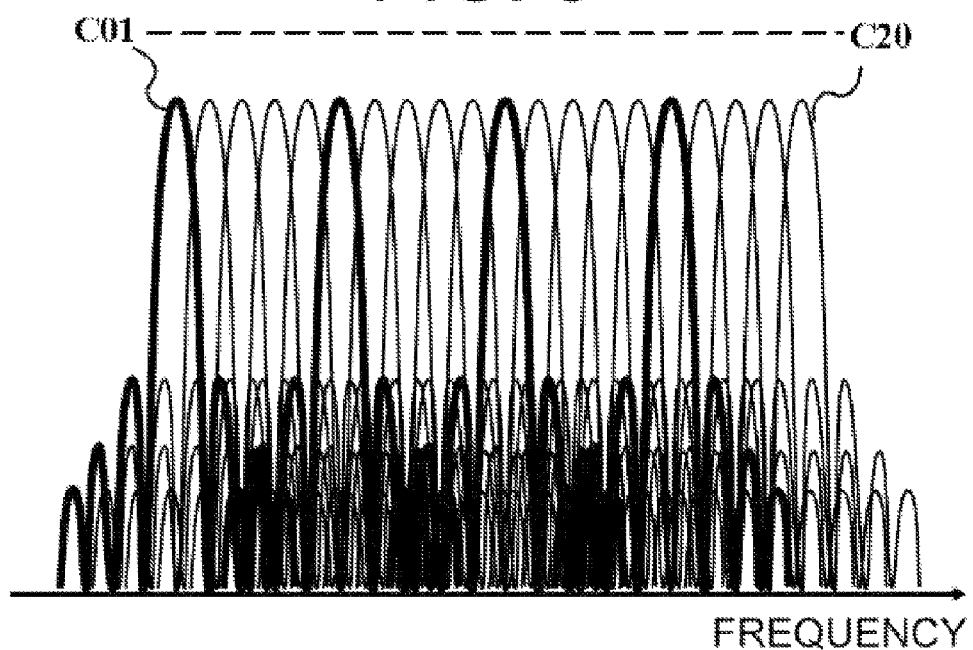
FIG. 3 illustrates a frequency characteristic for subcarriers.
Figure 4:
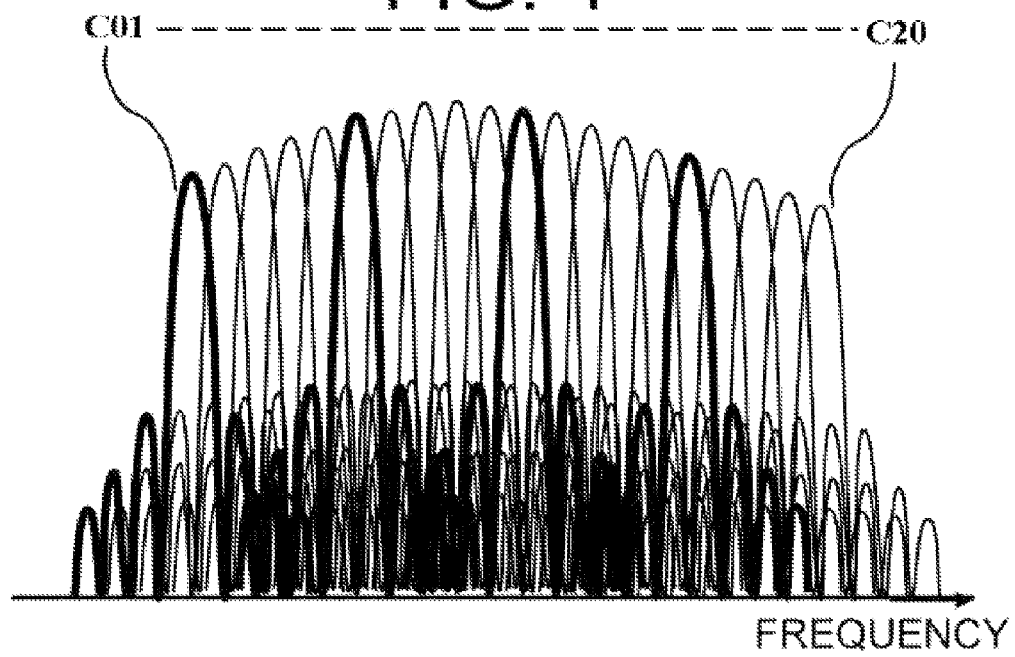
FIG. 4 illustrates a frequency characteristic for subcarriers.
Figure 5:
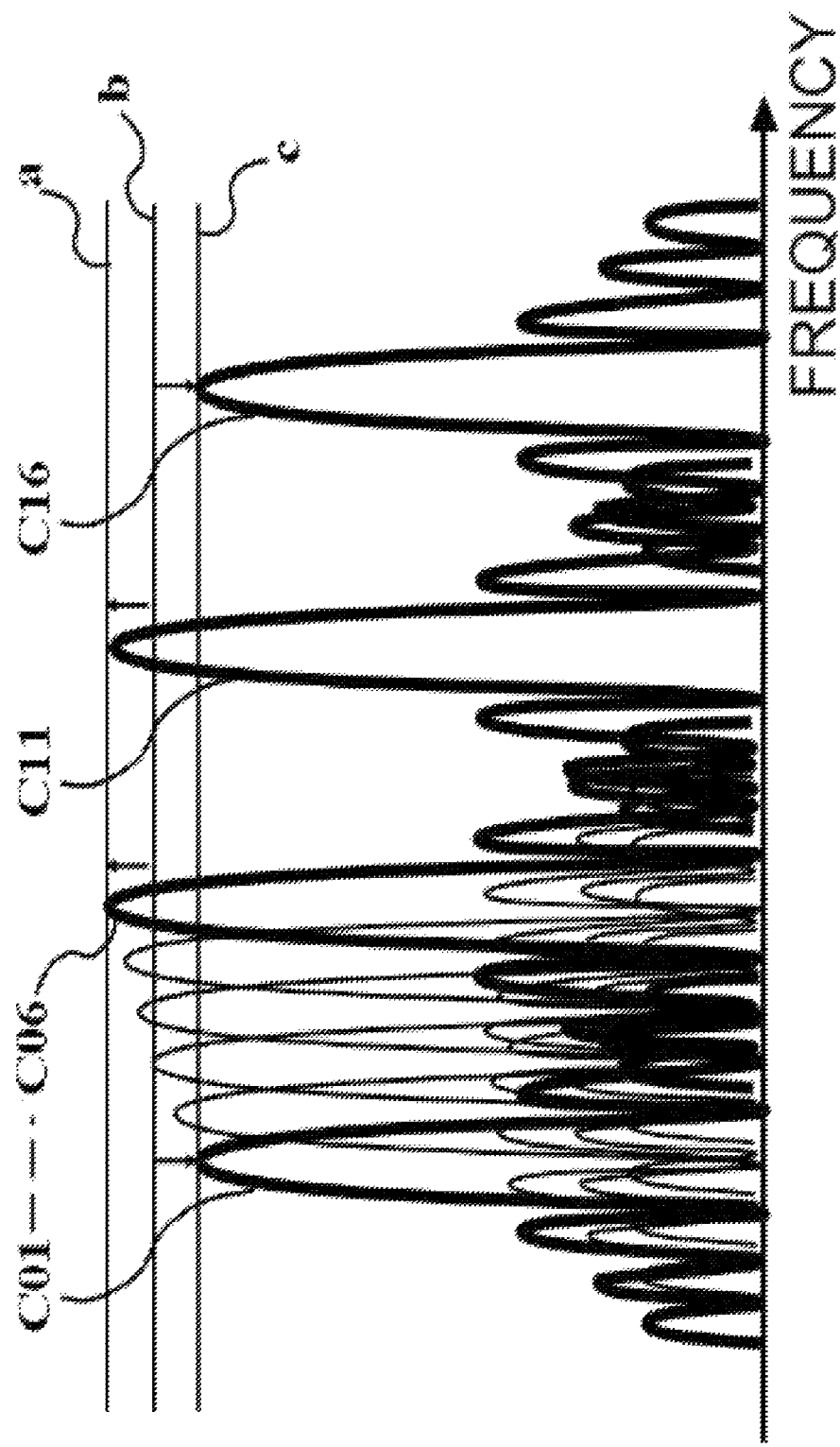
FIG. 5 illustrates a frequency characteristic for pilot subcarriers.

Examples of frequency characteristics for a signal level in a case of OFDM transmission are illustrated in FIGS. 3-5. FIGS. 3-5 each illustrate an OFDM signal that uses 20 subcarriers. In FIGS. 3-5, a numeral given each of the subcarriers starts from a subcarrier C01 of a lowest frequency, and a subcarrier of a highest frequency is given a numeral C20. Subcarriers C01, C06, C11 and C16 illustrated by bold lines indicate pilot carriers. A pilot carrier is a subcarrier to be used for communication control. Plural pilot carriers adjacent to each other can be provided.

Figure 1:
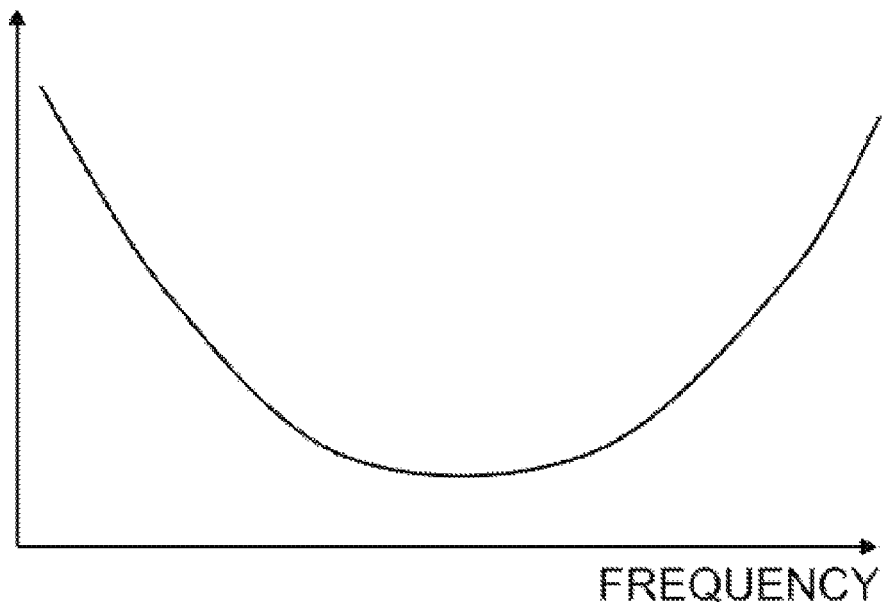
FIG. 1 illustrates an SWR characteristic of an antenna.
Figure 2:
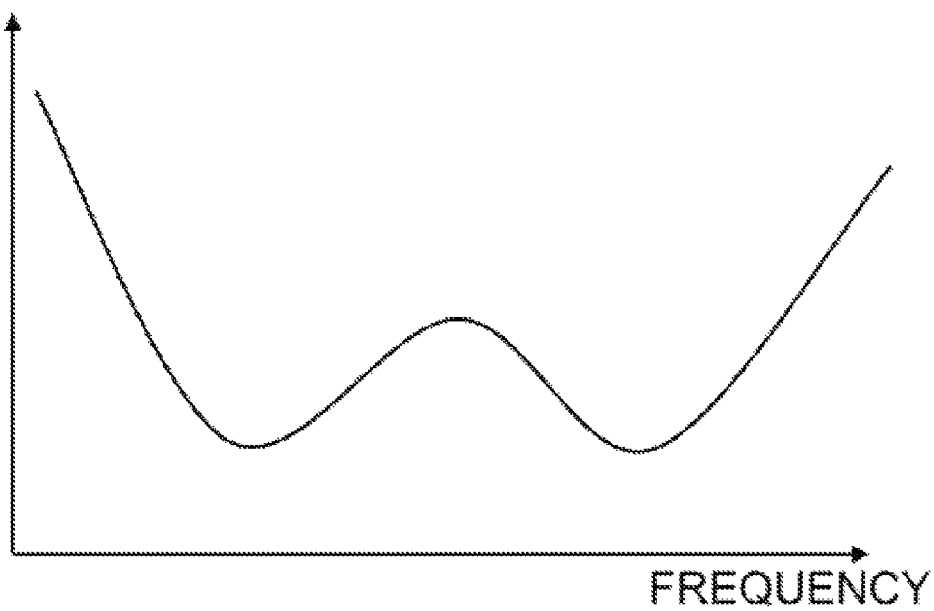
FIG. 2 illustrates an SWR characteristic of an antenna.

FIG. 3 illustrates a characteristic in a case where an SWR characteristic to frequencies of an antenna-feeder system is flat and output power of each of the subcarriers is equal one another. That is, FIG. 3 illustrates a frequency characteristic of each of the subcarriers in a perfect condition of the antenna-feeder system. FIG. 4 illustrates an actual frequency characteristic of each of subcarriers output from a terminal station 24. FIG. 4 illustrates the characteristics illustrated in FIG. 3 plus loss of the antenna-feeder system illustrated in FIG. 1. In FIG. 4, C09 is a subcarrier of a highest signal level. The signal level decreases as the frequency decreases and increases to a lower side and to a higher side, respectively. FIG. 5 illustrates the pilot carriers C01, C06, C11 and C16 and the subcarriers C02-C05 sorted out from the characteristics illustrated in FIG. 4. The following is found out from the characteristics illustrated in FIG. 5. An average of the carriers C01, C06, C11 and C16 is a signal level of b. Signal levels of the pilot carriers C01 and C16 are c that is lower than b. Signal levels of the pilot carriers C06 and C11 are a that is higher than b.

That is, if a signal level difference with respect to the value of b at a position of each of the subcarriers is taken into consideration, an effect of the frequency gain deviation of the antenna-feeder system can be avoided.

Specifically, a frequency division multiplex transmission device configured to transmit and receive a frequency multiplex signal having a plurality of subcarriers has a transmitter configured to transmit the frequency multiplex signal by using a plurality of modulation methods, a receiver configured to receive a signal state for the frequency multiplex signal from an opposite station, and a controller configured to obtain a signal state for each of the subcarriers on the basis of the received signal state and a frequency characteristic of an antenna included in the transmitter so as to control transmission on the basis of an obtained result.

The transmission control described above means selection of a modulation method according to a signal state of each of the subcarriers, or adjustment of transmission signal level. The selection of a modulation method and the adjustment of transmission signal level will be explained below as a first embodiment and a second embodiment, respectively.

OFDM System of First Embodiment

A first embodiment for implementing the above will be explained below. The first embodiment is an example configured to control selection of a modulation method of subcarriers by adding loss of an antenna-feeder system.

Figure 6:
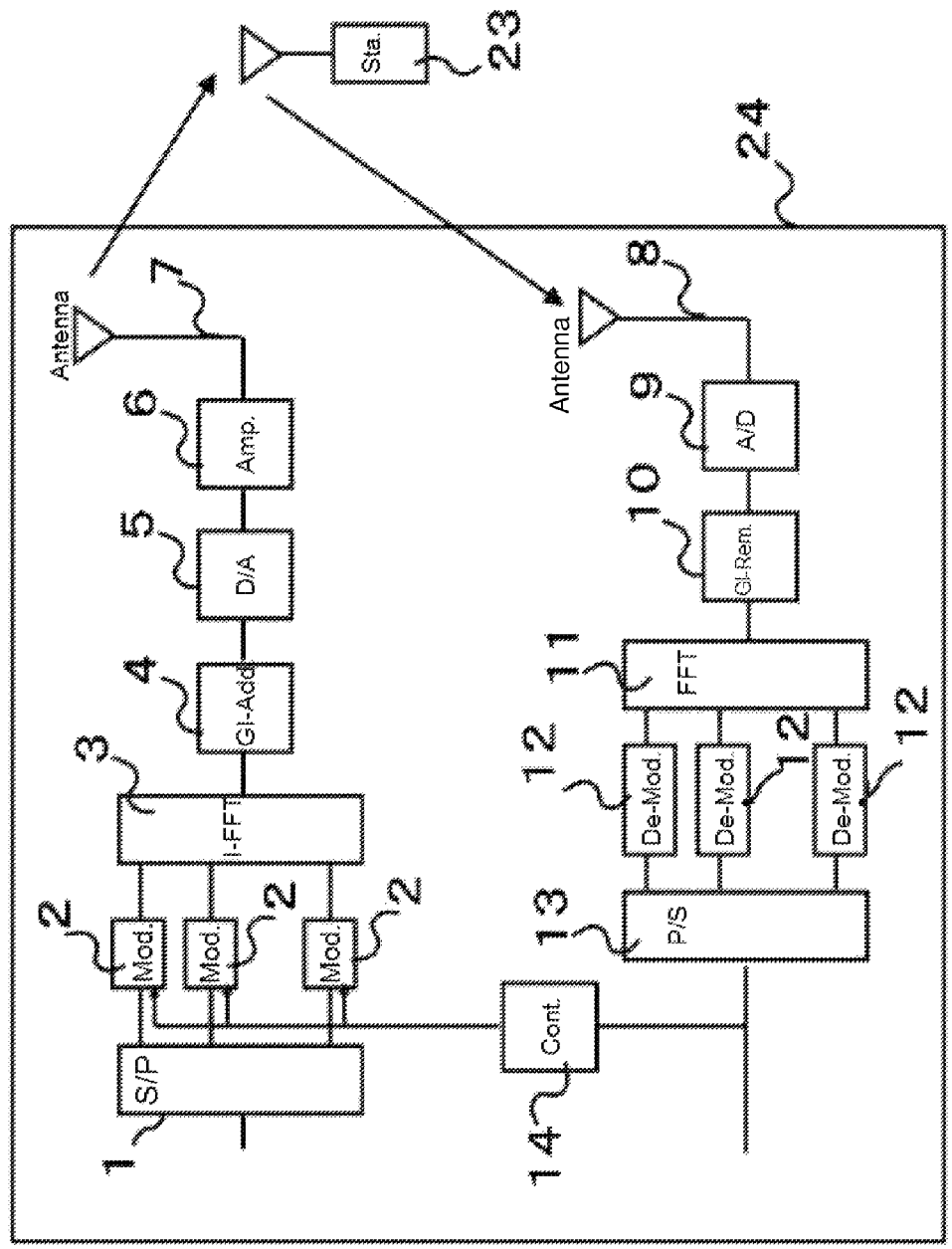
FIG. 6 illustrates a configuration of an OFDM system of the present invention.

FIG. 6 illustrates a configuration of an OFDM system of the first embodiment. The terminal station 24 is a terminal station as a radio communication device. In a transmitter of the terminal station 24, a serial/parallel converter 1 performs a serial/parallel (S/P) conversion for input data that has been encoded (error correction encoded). The S/P conversion converts serial data of high speed into a plurality of symbol streams of low speed. Each of these symbols corresponds to each of the subcarriers. A modulator 2 is provided for each of data streams of the divided symbols. The modulator 2 performs a certain modulation process that is predetermined (e.g., 64QAM, 16QAM, QPSK). An inverse Fourier transform (Inverse Fast Fourier Transform: IFFT) unit 3 performs an inverse Fourier transform process for a signal that has been primarily modulated as described above. The inverse Fourier transform can be considered as a conversion from a frequency domain to a time domain. A guard interval (GI) unit 4 adds a GI to the inverse Fourier transformed signal so as to avoid intersymbol interference accompanied by transmission. A digital/analog (D/A) converter 5 converts the GI-added symbol into an analog signal. The analog signal is provided with a carrier wave and is amplified by a final amplifier 6. The amplified analog signal is transmitted from an antenna element 7. Further, at least a plurality of pilot carriers is allocated in a plurality of the subcarriers.

The OFDM signal transmitted from the antenna element 7 is received by an opposite station 23 as a radio communication device. The opposite station 23 demodulates the OFDM signal transmitted from the terminal station 24 by using a receiver, and measures SNRs of the plural pilot carriers allocated to the subcarriers included in the OFDM signal. Then, the opposite station 23 calculates an average SNR of the plural pilot carriers from a measurement result. The opposite station 23 sends the calculated SNR to the terminal station 24 as a signal state of the pilot carriers. The opposite station 23 can be constituted by a transmitter and a receiver having a same configuration as the transmitter and the receiver of the terminal station 24, respectively.

In a receiver of the terminal station 24, an antenna element 8 receives an incoming signal. An analog/digital converter 9 digitizes the received signal. A guard interval unit 10 removes the guard interval from the digitized signal. The signal from which the guard interval has been removed is Fourier-transformed by a Fourier transform (Fast Fourier Transform: FFT) unit 11. The Fourier-transformed signal is demodulated by a demodulator 12 for each of the subcarriers. The demodulation by means of the demodulator 12 produces a data stream corresponding to each of the subcarriers. These are converted by a parallel/serial (P/S) converter 13 so that demodulated received data is obtained. A later stage of the P/S converter 13 performs a decoding process necessary for data processing and so on.

A controller 14 in the terminal station 24 obtains a signal state of the subcarriers by using the average SNR of the plural pilot carriers sent by the opposite station 23, and selects an optimum modulation method. Further, the controller 14 sets the selected method to the modulator 2. Specifically, the controller 14 obtains an SNR corresponding to each of the subcarriers from the received average SNR and a frequency characteristic of the antenna, and performs a control for changing the modulation method in accordance with the obtained SNR (adaptive modulation control).

Configuration of the Controller of the First Embodiment

Figures 7, 8:
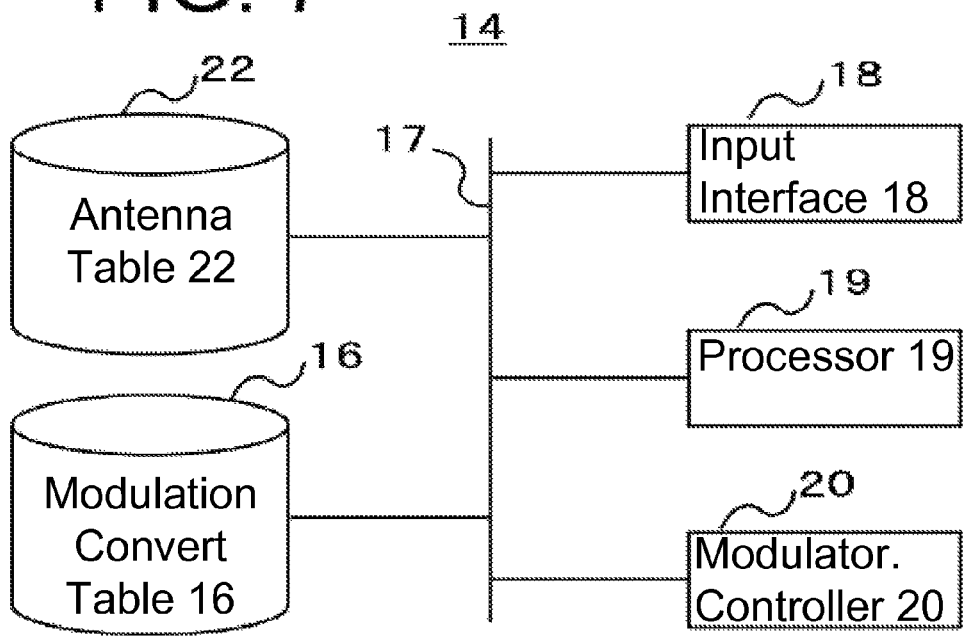
FIG. 7 illustrates a configuration of a controller of a first embodiment.
FIG. 8 illustrates an example of a modulation method conversion table.

FIG. 7 illustrates a configuration of the controller 14 of the first embodiment. FIG. 7 illustrates a state in which an input interface 18, a processor 19, a modulator controller 20, an antenna table 22 and a modulation method conversion table 16 are connected to a bus 17.

The input interface 18 receives a signal provided from the parallel/serial (P/S) converter 13 illustrated in FIG. 6. Further, the input interface 18 extracts the average SNR of the plural pilot carriers sent by the opposite station 23.

The antenna table 22 is a table that stores to what dB each of the subcarriers is different from the average SNR of the pilot carriers. The SWR characteristic of the antenna-feeder system is measured so that this table is prepared beforehand. The antenna table 22 forms a table illustrating how much difference there is from the average value b of the pilot carriers at the frequency position of each of the subcarriers from the characteristics illustrated in FIGS. 4 and 5. In FIG. 5, e.g., C01 and C16 are 2 dB lower than the average value, and C06 and C11 are 2 dB higher than the average value. In this way, the antenna table 22 stores on the table to what dB each of the subcarriers is different from the average value.

The modulation method conversion table 16 is a table that stores optimum modulation methods corresponding to SNRs. FIG. 8 illustrates an example of the modulation method conversion table 16. In FIG. 8, the table is formed such that, if the SNR is in a poor signal state 803 (less than or equal to 11 dB), a middle signal state 802 (more than 11 dB and less than 15 dB) and a good signal state 801 (more than or equal to 15 dB), modulation methods of QPSK, 16QAM and 64QAM are selected, respectively.

The processor 19 obtains the average SNR of the plural pilot carriers from the input interface 18. Then, the processor 19 calculates an SNR estimated value, which is a signal state of each of the subcarriers, from a signal level difference to each of the subcarriers from the antenna table 22 and the average SNR of the plural pilot carriers. The processor 19 compares the calculated SNR estimated value and the modulation method conversion table 16, and selects a modulation method.

The modulator controller 20 controls the modulators 2 such that each of the modulators 2 performs the modulation process by using the modulation method selected by the processor 19.

Control Procedure of the Processor of the First Embodiment

Figure 9:
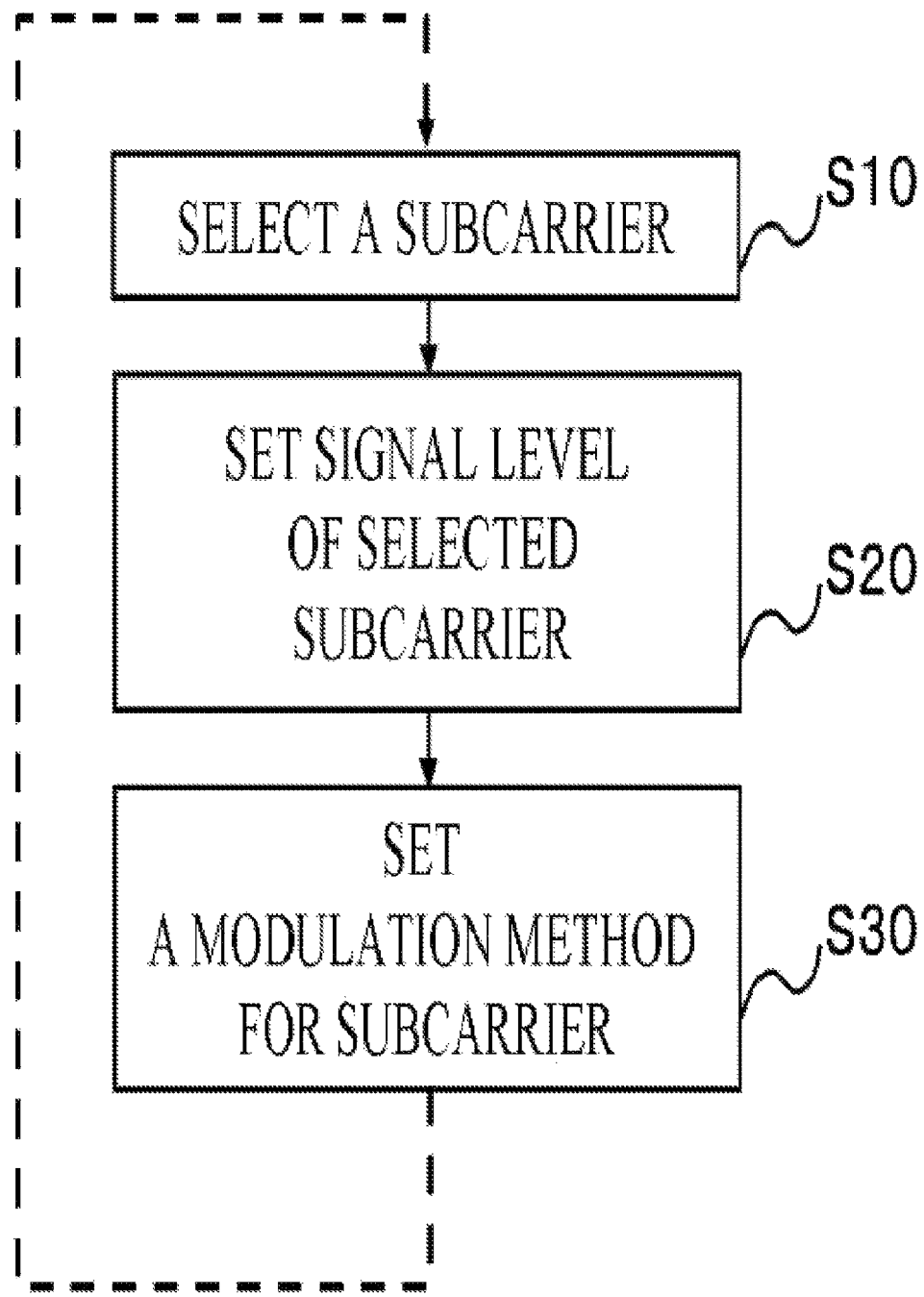
FIG. 9 illustrates a control procedure of a processor of the first embodiment.
Figure 10:
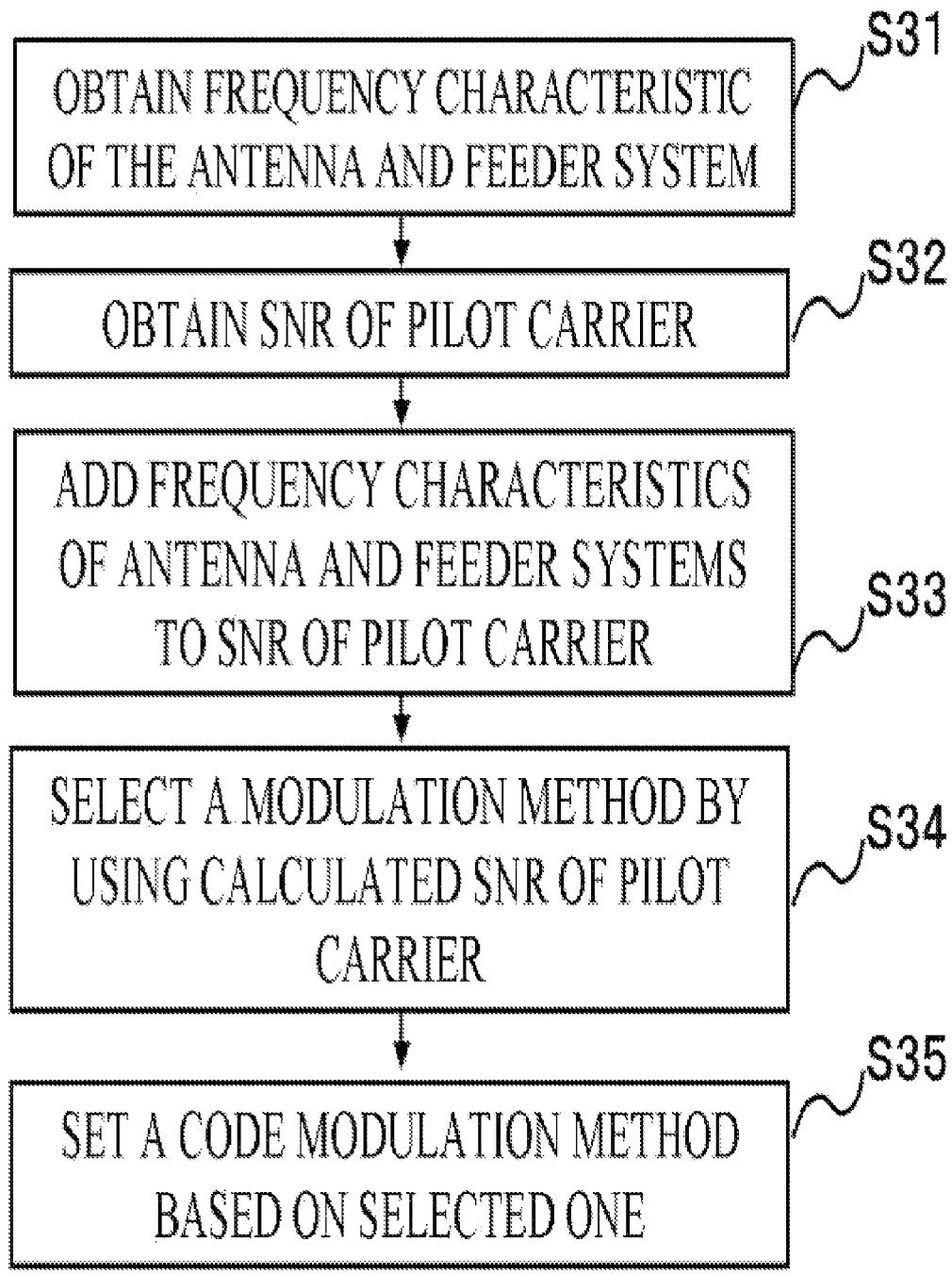
FIG. 10 illustrates the control procedure of the processor of the first embodiment.

FIGS. 9 and 10 illustrate a control procedure of the processor of the first embodiment. FIG. 9 is used for explaining a flow of the whole control. First, the processor 19 performs a step S10. At the step S10, the processor 19 selects one subcarrier to be adjusted. This selection is made sequentially in predetermined order. Then, the processor 19 performs a step S20. At the step S20, the processor 19 sets predetermined transmission signal level to the selected subcarrier. Then, the processor 19 performs a step S30. At the step S30, the processor 19 selects a code modulation method for the selected subcarrier. Then, upon finishing the step S30, the processor 19 returns to the step S10 and again selects a subcarrier to be adjusted.

FIG. 10 illustrates a flow within the step S30 illustrated in FIG. 9. First, the processor 19 performs a step S31. At the step S31, the processor 19 reads from the antenna table 22 a signal level difference corresponding to the subcarrier selected at the step S10. This signal level difference is a value based on the frequency characteristic of the antenna-feeder system.

Then, the processor 19 performs a step S32. At the step S32, the processor 19 obtains an average value of the pilot carriers from the input interface 18.

Then, the processor 19 performs a step S33. At the step S33, the processor 19 calculates an SNR value by adding the signal level difference of the subcarrier obtained at the step S31 to the average SNR obtained at the step S32.

Then, the processor 19 performs a step S34. At the step S34, the processor 19 refers to the modulation method conversion table 16 by using the SNR value calculated at the step S33. Then, the processor 19 selects a modulation method on the basis of a comparison result.

Then, the processor 19 performs a step S35. At the step S35, the processor 19 orders the modulator controller 20 to set the modulation method selected at the step 10 to the modulator 2.

After the above, the modulator controller 20 controls the modulators 2 so as to perform the modulation process by using the modulation method selected by the processor 19 as explained with respect to the control of the modulator controller 20 illustrated in FIG. 7.

A specific example of the modulation method control will be explained by using the subcarrier C02. In FIG. 5, a is 2 dB higher than b, and c is 2 dB lower than b. Thus, C02 has a value between b and c (greater than −2 dB and smaller than 0 dB). It is assumed to be written on the antenna table that C02 has −1 dB. If the average SNR from the opposite station is 13 dB, the SNR of C02 is 13 dB −1 dB=12 dB.

If the value of C02, 12 dB, after being calculated (corrected) is compared with the value on the table illustrated in FIG. 8, the method of 16QAM is selected.

As the first embodiment is configured such that the opposite station sends the average SNR of the plural pilot carriers back, a difference from the average of the pilot carriers for which the signal level of each of the subcarriers is plural is stored as a table on the antenna table 22. The embodiment, however, need not use the average of the plural pilot carriers. In a case where the opposite station 25 sends an SNR to a particular pilot carrier back, e.g., to what extent each of the subcarriers is different from the particular pilot carrier may be formed as a table on the basis of FIGS. 4 and 5.

For the first embodiment, a plurality of the subcarriers may be grouped. Frequency bands each of which is formed by the grouped plural subcarriers are allocated different modulation methods in accordance with a state of frequency-selective fading. In a group of C01-C05, e.g., the processor reads a signal level difference of the pilot carrier C01, obtains an SNR of the pilot carrier C01 and selects a modulation method of C02-C05. In this way, the number of times of selecting the modulation method of the subcarriers can be reduced.

A second embodiment will be explained below. The second embodiment is an example for saving transmission power while taking the characteristic of the antenna-feeder system into consideration in a case where the modulation method is fixed.

OFDM System of the Second Embodiment

Figure 11:
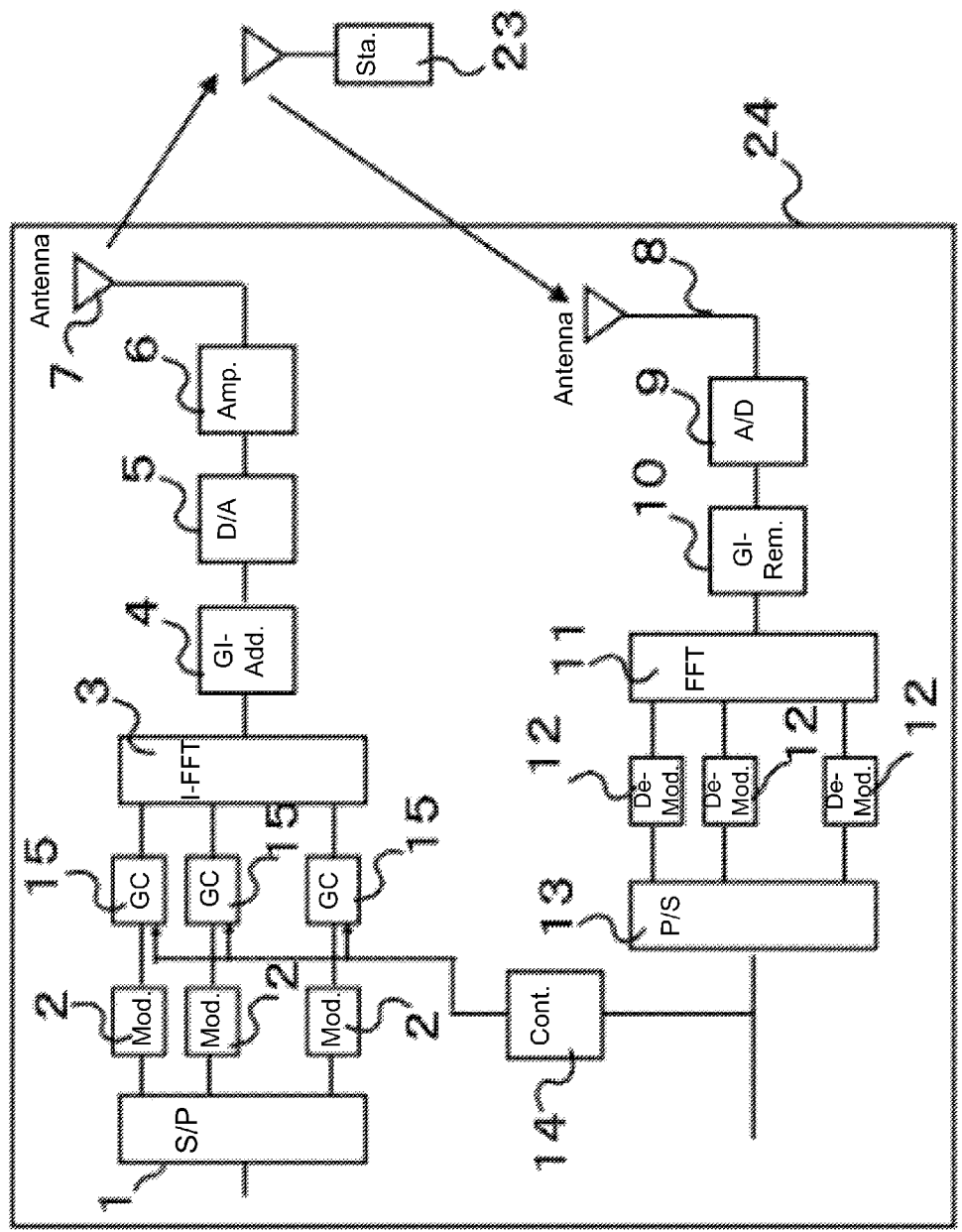
FIG. 11 is a configuration of an OFDM system of a second embodiment.

FIG. 11 illustrates a configuration of an OFDM system of the second embodiment. The terminal station 24 is a terminal station as a radio communication device. In a transmitter of the terminal station 24, a serial/parallel converter 1 performs a serial/parallel (S/P) conversion for input data that has been encoded (error correction encoded). The S/P conversion converts serial data of high speed into a plurality of symbol streams of low speed. Each of these symbols corresponds to each of the subcarriers. A modulator 2 is provided for each of data streams of the divided symbols. The modulator 2 performs a certain modulation process that is predetermined (e.g., 64QAM, 16QAM, QPSK). A gain controller 15 provided for each of the data streams controls a gain of a signal modulated on each of the data streams. An inverse Fourier transform (Inverse Fast Fourier Transform: IFFT) unit 3 performs an inverse Fourier transform process for a signal that has been gain-controlled as described above. The inverse Fourier transform can be considered as a conversion from a frequency domain to a time domain. A guard interval (GI) unit 4 adds a GI to the inverse Fourier transformed signal so as to avoid intersymbol interference accompanied by transmission. A digital/analog (D/A) converter 5 converts the GI-added symbol into an analog signal. The analog signal is provided with a carrier wave and is amplified by a final amplifier 6. The amplified analog signal is transmitted from an antenna element 7. Further, at least a plurality of pilot carriers is allocated in a plurality of the subcarriers.

The OFDM signal transmitted from the antenna element 7 is received by an opposite station 23 as a radio communication device. The opposite station 23 demodulates the OFDM signal transmitted from the terminal station 24 by using a receiver, and measures SNRs of the plural pilot carriers allocated to the subcarriers included in the OFDM signal. Then, the opposite station 23 calculates an average SNR of the plural pilot carriers from a measurement result. The opposite station 23 sends the calculated SNR to the terminal station 24 as a signal state of the pilot carriers. The opposite station 23 can be constituted by a transmitter and a receiver having a same configuration as the transmitter and the receiver of the terminal station 24, respectively.

In a receiver of the terminal station 24, an antenna element 8 receives an incoming signal. An analog/digital converter 9 digitizes the received signal. A guard interval unit 10 removes the guard interval from the digitized signal. The signal from which the guard interval has been removed is Fourier-transformed by a Fourier transform (Fast Fourier Transform: FFT) unit 11. The Fourier-transformed signal is demodulated by a demodulator 12 for each of the subcarriers. The demodulation by means of the demodulator 12 produces a data stream corresponding to each of the subcarriers. These are converted by a parallel/serial (P/S) converter 13 so that demodulated received data is obtained. A later stage of the P/S converter 13 performs a decoding process necessary for data processing and so on.

A controller 14 of the terminal station 24 obtains an optimum gain by using the average SNR of the plural pilot carriers, and performs a control for transmission signal level of each of the subcarriers in accordance with the obtained SNR value.

Configuration of the Controller of the Second Embodiment

Figure 12:
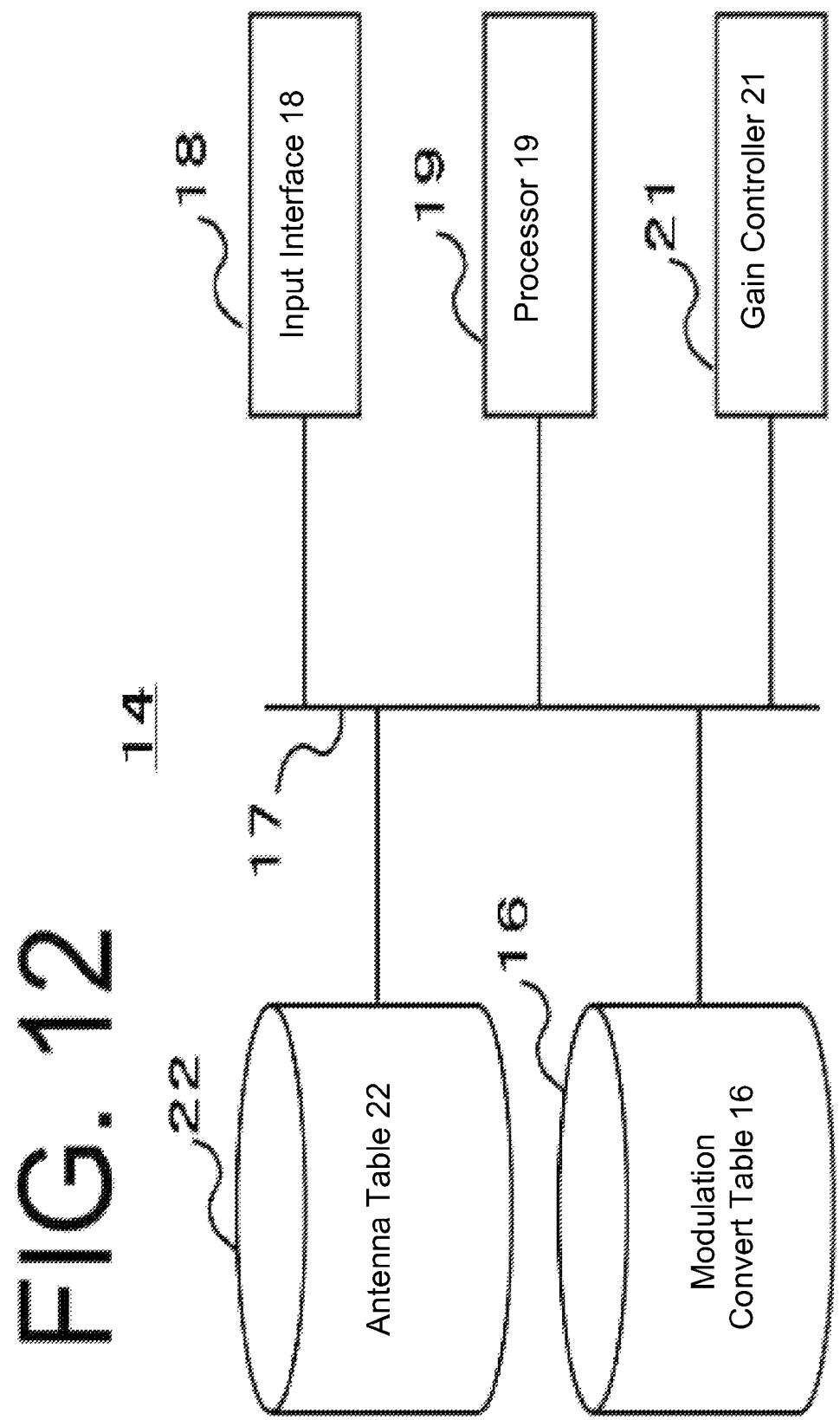
FIG. 12 illustrates a configuration of a controller of the second embodiment.

FIG. 12 illustrates a configuration of the controller 14 of the second embodiment. FIG. 12 illustrates a state in which an input interface 18, a processor 19, a controller of the gain controller 21, an antenna table 22 and a modulation method conversion table 16 are connected to a bus 17.

The input interface 18 receives a signal provided from the parallel/serial (P/S) converter 13 illustrated in FIG. 11. Further, the input interface 18 extracts the average SNR of the plural pilot carriers sent by the opposite station 23.

The antenna table 22 is a table that stores to what dB each of the subcarriers is different from the average SNR of the pilot carriers. The SWR characteristic of the antenna-feeder system is measured so that this table is prepared beforehand. The antenna table 22 forms a table illustrating how much difference there is from the average value b of the pilot carriers at the frequency position of each of the subcarriers from the characteristics illustrated in FIGS. 4 and 5. In FIG. 5, e.g., C01 and C16 are 2 dB lower than the average value, and C06 and C11 are 2 dB higher than the average value. In this way, the antenna table 22 stores on the table to what dB each of the subcarriers is different from the average value.

The modulation method conversion table 16 is a table that stores optimum modulation methods corresponding to SNRs. FIG. 8 illustrates an example of the modulation method conversion table 16. In FIG. 8, the table is formed such that, if the SNR is in a poor signal state 803 (less than or equal to 11 dB), a middle signal state 802 (more than 11 dB and less than 15 dB) and a good signal state 801 (more than or equal to 15 dB), modulation methods of QPSK, 16QAM and 64QAM are selected, respectively.

The processor 19 obtains the average SNR of the plural pilot carriers from the input interface 18, compares the obtained average SNR of the plural pilot carriers with the modulation method conversion table 16, selects a modulation method on the basis of a comparison result, and calculates a difference between the average SNR of the pilot carriers and an SNR required for the modulation method selected at each of the subcarriers.

The controller of the gain controller 21 controls the gain controller 15 on the basis of a result calculated by the processor 19. Specifically, a subcarrier of an excessive signal level decreases its gain, and a subcarrier of an inadequate signal level increases its gain.

Control Procedure of the Processor of the Second Embodiment

Figure 13:
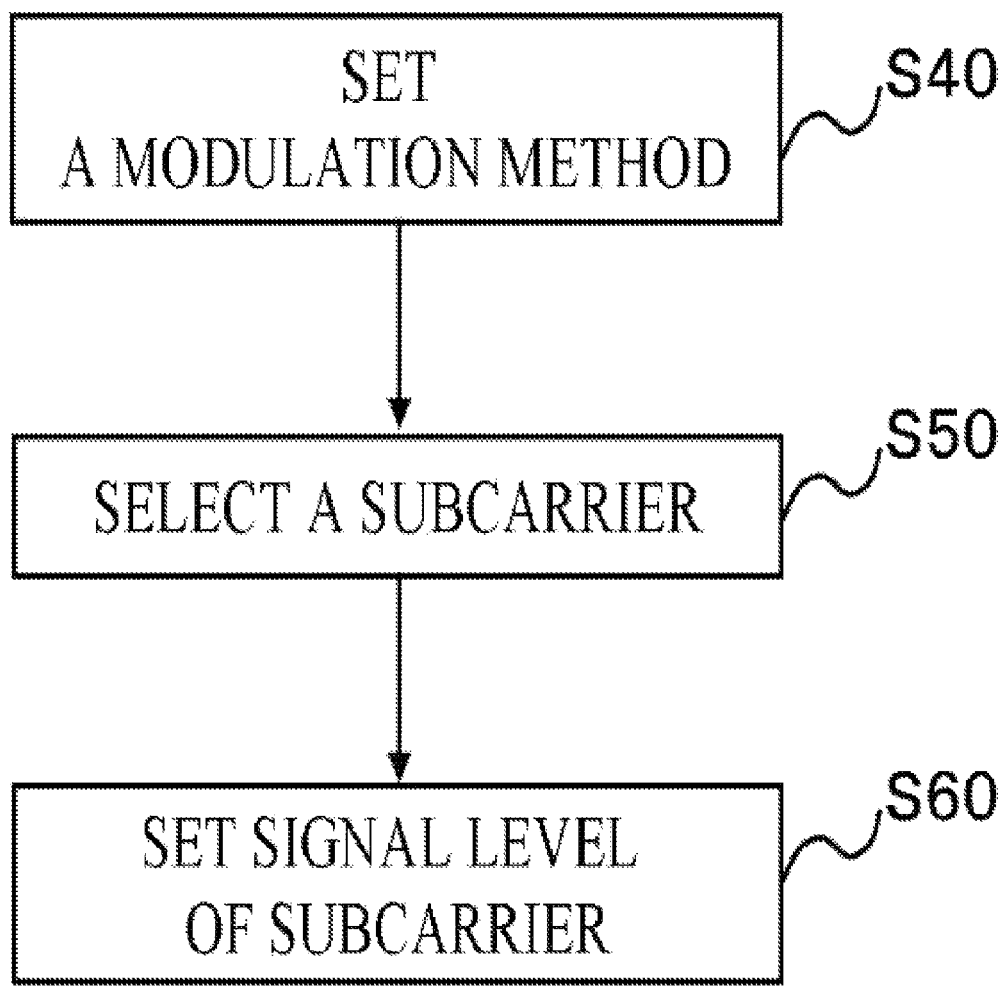
FIG. 13 illustrates a control procedure of a processor of the second embodiment.
Figure 14:
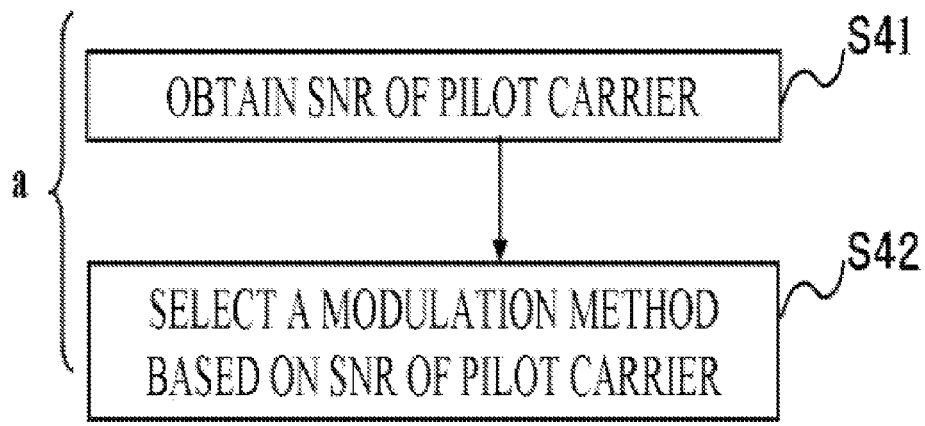
FIGS. 14A and 14B illustrate the control procedure of the processor of the second embodiment.
Figure 14:
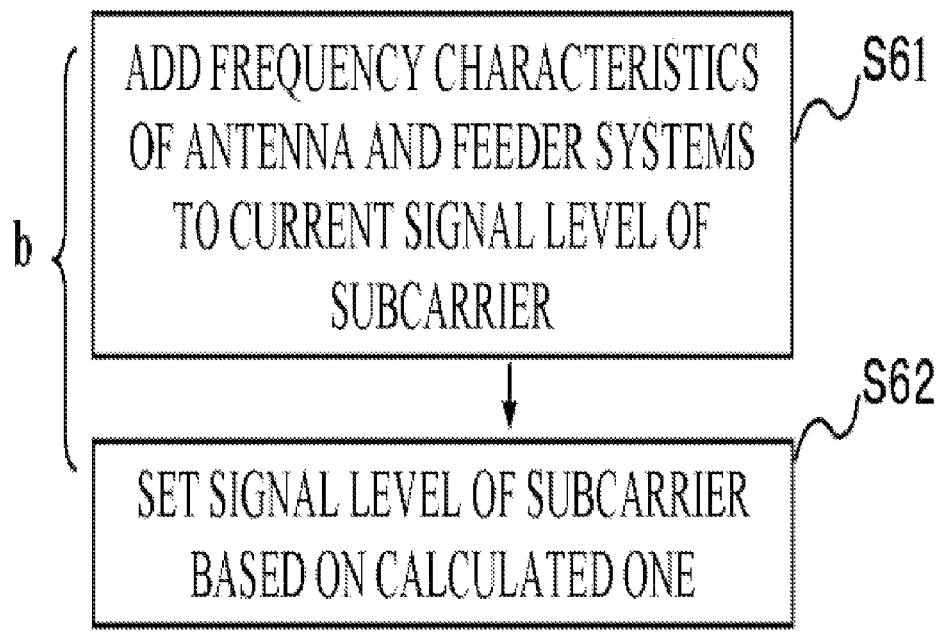

FIGS. 13, 14A and 14B illustrate a control procedure of the processor of the second embodiment. FIG. 13 is used for explaining a flow of the whole control. First, the processor 19 performs a step S40. At the step S40, the processor 19 selects a code modulation method. Specifically, as illustrated by in FIG. 14A, the processor 19 obtains the average SNR of the pilot carriers from the input interface 18 at a step S41. Further, at a step S42, the processor 19 selects a modulation method from the average SNR of the plural pilot carriers. The processor 19 sets the code modulation method on the basis of a result of the selection.

Then, the processor 19 performs a step S50 illustrated in FIG. 13. At the step S50, the processor 19 selects a subcarrier for sending data to the opposite station 23.

Then, the processor 19 performs a step S60 illustrated in FIG. 13. The processor 19 calculates a difference between the average SNR and the SNR required for the modulation method at the subcarrier selected at the step S50, and controls the gain of the subcarrier selected at the step S50.

Specifically, as a step S61 of in FIG. 14B, the processor 19 calculates a difference of the SNR required for the modulation method at the subcarrier selected at the step S50 from the average SNR of the pilot carriers on the basis of average SNR of the pilot carriers and the antenna table based on the characteristic illustrated in FIGS. 4 and 5.

ADVANTAGES

According to the present embodiments, in a case where frequency division multiplex transmission is performed, the transmission can be performed while an effect of a frequency-gain deviation of an antenna-feeder system is being taken into consideration.

The embodiments described above can be properly combined as necessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A frequency multiplex transmission device configured to transmit and receive a frequency multiplex signal having a plurality of subcarriers, the frequency multiplex transmission device comprising:
   a transmitter configured to transmit the frequency multiplex signal by using a plurality of modulation methods;
   a receiver configured to receive a signal state to the frequency multiplex signal from an opposite station; and
   a controller configured to obtain a signal state to each of the subcarriers on the basis of the received signal state and a frequency-SWR (Standing Wave Ratio) characteristic of an antenna and a feeder included in the transmitter, the controller being configured to control transmission on the basis of an obtained result.

2. The frequency multiplex transmission device according to claim 1, wherein the controller is further configured to set modulation of data on the basis of a result of the signal state to each of the subcarriers.

3. The frequency multiplex transmission device according to claim 1, wherein the controller is further configured to control a gain to each of the subcarriers on the basis of a result of the signal state to each of the subcarriers.

4. The frequency multiplex transmission device according to claim 1, wherein the received signal state is an average of a plurality of signal-to-noise ratios of the plurality of subcarriers.

5. The frequency multiplex transmission device according to claim 4, wherein the controller is configured to select one of the subcarriers to be controlled, the controller being configured to control the selected subcarrier on the basis of a table that stores data with respect to whether there is a difference between the selected subcarrier and the average of the signal-to-noise ratios.

6. A frequency multiplex transmission device configured to perform frequency multiples transmission by using a plurality of subcarriers, comprising:
   a serial/parallel converter configured to arrange transmission data in line in correspondence with the plural subcarriers;
   a plurality of modulators each of which is provided for data corresponding to each of the subcarriers, each of the modulators being configured to modulate the data by using a selected one of a plurality of modulation methods;
   an inverse Fourier transform unit provided for outputs from the plural modulators;
   a transmitter configured to transmit an output of the inverse Fourier transform unit from an antenna and a feeder as a radio wave;
   a receiver configured to receive a radio wave provided from the antenna and the feeder;
   a Fourier transform unit configured to Fourier transform a signal provided from the receiver;
   a plurality of demodulators each of which is provided for each of a plurality of outputs from the Fourier transform unit, each of the demodulators being configured to demodulate each of the plural outputs;
   a parallel/serial converter configured to arrange a plurality of outputs of the plural demodulators in series; and
   a controller configured to control a modulation method of each of the modulators on the basis of a frequency-SWR (Standing Wave Ratio) characteristic of the antenna and a signal-to-noise ratio of the corresponding subcarrier.

* * * * *